(12) United States Patent
Lee (10) Patent No.: US 9,874,773 B2
(45) Date of Patent: Jan. 23, 2018

(54) DISPLAY APPARATUS

(71) Applicant: SAMSUNG DISPLAY CO., LTD., Yongin-si, Gyeonggi-do (KR)

(72) Inventor: Hyunhee Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 72 days.

(21) Appl. No.: 15/147,488

(22) Filed: May 5, 2016

(65) Prior Publication Data

US 2017/0090649 A1 Mar. 30, 2017

(30) Foreign Application Priority Data

Sep. 30, 2015 (KR) ........................ 10-2015-0138112

(51) Int. Cl.
| | |
|---|---|
| *G06F 3/041* | (2006.01) |
| *G02F 1/1333* | (2006.01) |
| *G06F 3/044* | (2006.01) |
| *G02F 1/1368* | (2006.01) |
| *G02F 1/1335* | (2006.01) |

(52) U.S. Cl.
CPC ...... *G02F 1/133345* (2013.01); *G02F 1/1368* (2013.01); *G02F 1/13338* (2013.01); *G02F 1/133514* (2013.01); *G06F 3/041* (2013.01); *G06F 3/044* (2013.01); *G02F 2202/28* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 4,634,917 | A | * 1/1987 | Dvorsky | ............... G01B 7/004 310/323.21 |
| 5,515,738 | A | * 5/1996 | Tamori | ..................... G01L 1/16 310/338 |
| 2010/0013785 | A1 | * 1/2010 | Murai | ................... G06F 3/0414 345/173 |
| 2013/0027340 | A1 | * 1/2013 | Kodani | ................... G06F 3/041 345/173 |
| 2015/0331517 | A1 | * 11/2015 | Filiz | ..................... G06F 3/0414 345/173 |

FOREIGN PATENT DOCUMENTS

| | | |
|---|---|---|
| KR | 10-2011-0071521 | 6/2011 |
| KR | 10-2013-0046197 | 5/2013 |
| KR | 10-2013-0109547 | 10/2013 |
| KR | 10-2013-0143201 | 12/2013 |
| KR | 10-2014-0012410 | 2/2014 |
| KR | 10-2014-0017039 | 2/2014 |

\* cited by examiner

*Primary Examiner* — Nicholas Lee
(74) *Attorney, Agent, or Firm* — Lewis Roca Rothgerber Christie LLP (57) ABSTRACT

A display apparatus includes a display panel configured to display an image; a touch panel on the display panel and including a touch region configured to extract a touch coordinate when a touch is generated thereon, and a non-touch region adjacent to the touch region; a cover glass on the touch panel; a piezoelectric element on the cover glass and covering the touch region, the piezoelectric element being configured to generate an electrical change by a pressure of the touch; and a pressure calculating unit configured to calculate a magnitude of the pressure based on the generated electrical change.

20 Claims, 7 Drawing Sheets

DISPLAY APPARATUS

CROSS-REFERENCE TO RELATED APPLICATION

This application claims priority to and the benefit of Korean Patent Application No. 10-2015-0138112, filed on Sep. 30, 2015 in the Korean Intellectual Property Office, the entire content of which is hereby incorporated by reference.

BACKGROUND

1. Field

Aspects of the present disclosure relate to a display apparatus.

2. Description of the Related Art

A variety of display apparatuses, such as mobile phones, personal digital assistants (PDAs), and navigation devices, are expanding functions of multi-media providers. Existing display apparatuses employ an additional input device, such as a keypad or a keyboard, as an input means. Recently, display apparatuses are employing a touch panel as an input means in order to achieve miniaturization, ease of mobility, maximization of a display region, and the like. A touch panel is attached to a display panel of display apparatuses for use thereof.

An existing touch screen panel only senses a touch coordinate input by a user and may not recognize a touch force applied by the user. Therefore, the existing display apparatus has a limitation in expression, such as thickness and darkness of a line expressed by a pen thereon.

SUMMARY

According to an aspect of embodiments of the present disclosure, a display apparatus includes a piezoelectric element disposed on a cover glass such that a touch force may be recognized.

According to an embodiment of the present invention, a display apparatus includes a display panel configured to display an image; a touch panel on the display panel and including a touch region configured to extract a touch coordinate when a touch is generated thereon, and a non-touch region adjacent to the touch region; a cover glass on the touch panel; a piezoelectric element on the cover glass and covering the touch region, the piezoelectric element being configured to generate an electrical change by a pressure of the touch; and a pressure calculating unit configured to calculate a magnitude of the pressure based on the generated electrical change.

In an embodiment, the piezoelectric element may have a larger area than the touch region of the touch panel.

In an embodiment, the display apparatus may further include a transparent film on the piezoelectric element and the cover glass and covering the piezoelectric element.

In an embodiment, the piezoelectric element may include at least one of a single crystal material, a polycrystalline material, a polymeric material, a composite material, or a thin film-type material.

In an embodiment, the single crystal material may be at least one of $\alpha$-$AlPO_4$ (berlinite), $\alpha$-$SiO_2$ (quartz), $LiTaO_3$, $LiNbO_3$, $Sr_xBa_yNb_2O_8$, $Pb_5$—$Ge_3O_{11}$, $Tb_2(MoO_4)_3$, $Li_2B_4O_7$, CdS, ZnO, $Bi_{12}SiO_{20}$, or $Bi_{12}GeO_{20}$.

In an embodiment, the polycrystalline material may be at least one of a PZT ceramic, a PT ceramic, a PZT-complex perovskite-based structure, or $BaTiO_3$.

In an embodiment, the polymeric material may be at least one of PVDF, P(VDF-TrFe), P(VDFTeFE), or TGS.

In an embodiment, the composite material may be at least one of PZT-PVDF, PZT-silicone rubber, PZT-epoxy, PZT-polymer foam, or PZT-urethane foam.

In an embodiment, the thin film-type material may be at least one of ZnO, CdS, or AlN.

A display apparatus according to another embodiment of the present invention may have a same or similar configuration as a display apparatus as described above except for a difference in a configuration of the touch panel.

BRIEF DESCRIPTION OF THE DRAWINGS

The accompanying drawings are included to provide a further understanding of the present inventive concept, and are incorporated in and constitute a part of this specification. The drawings illustrate some exemplary embodiments of the present inventive concept and, together with the description, serve to explain aspects and principles of the present inventive concept. In the drawings.

DETAILED DESCRIPTION

Embodiments of the present inventive concept may be variously modified and embodied in various forms, and, thus, some exemplary embodiments are shown in the drawings and described in further detail herein. However, the present inventive concept is not limited to the specific disclosed forms, and should be construed to include all modifications, equivalents, or replacements included in the spirit and technical range of the present inventive concept.

Figure 1:
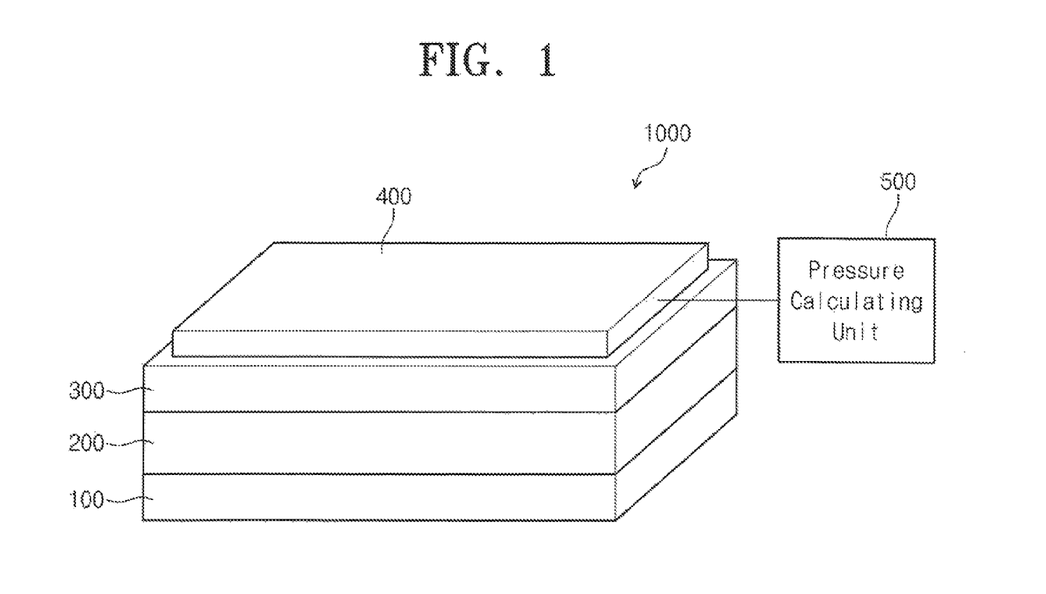
FIG. 1 is a perspective view of a touch display apparatus according to an embodiment of the present inventive concept.

FIG. 1 is a perspective view of a display apparatus according to an embodiment of the present inventive concept.

Referring to FIG. 1, a display apparatus 1000 according to an embodiment of the present inventive concept includes a display panel 100, a touch panel 200, a cover glass 300, a piezoelectric element 400, and a pressure calculating unit 500.

The display panel 100 displays an image. The display panel 100 may include any of a variety of display panels, such as a liquid crystal display panel, an organic light emitting display panel, a plasma display panel, an electrophoretic display panel, or an electrowetting display panel.

The display panel 100 may be provided in the form of a plate. Although a shape of the display panel 100 when viewed from above is not limited, the display panel 100, as illustrated in FIG. 1, may have a rectangular shape when viewed in a thickness direction of the display panel 100.

The touch panel 200 is arranged or disposed on the display panel 100. The touch panel 200 may be provided in the form of a plate. Although a shape and a size of the touch panel 200 when viewed from above are not limited, the touch panel 200, as illustrated in FIG. 1, may have a rectangular shape when viewed in the thickness direction of the touch panel 200.

An operating principle and a structure of the touch panel 200 will be described further below.

The cover glass 300 is arranged or disposed on the touch panel 200. The cover glass 300 may be provided in the form of a plate. Although a shape and a size of the cover glass 300 when viewed from above are not limited, the cover glass 300, as illustrated in FIG. 1, may have a rectangular shape when viewed in a thickness direction of the cover glass 300.

The display panel 100 and the touch panel 200 may be damaged by a fingerprint and/or a scratch due to a touch, or by external factors such as moisture or dust. The cover glass 300 protects the display panel 100 and the touch panel 200.

The cover glass 300 may be substantially transparent and most of light incident on the cover glass 300 may pass through the cover glass 300.

The cover glass 300 may be formed of any of a variety of materials, such as a glass, a ceramic, or a polymer resin.

The piezoelectric element 400 is disposed on the cover glass 300. The piezoelectric element 400 may have a shape of a plate.

According to an embodiment, when a pressure by a touch is applied to the piezoelectric element 400, an arrangement of crystals inside the piezoelectric element 400 is changed, such that the piezoelectric element 400 generates an electrical change. The electrical change is used to measure a touch force by the pressure calculating unit 500.

The piezoelectric element 400 may include at least one of a single crystal material, a polycrystalline material, a polymeric material, a composite material, or a thin film-type material.

The single crystal material may be at least one of α-AlPO$_4$ (berlinite), α-SiO$_2$ (quartz), LiTaO$_3$, LiNbO$_3$, Sr$_x$Ba$_y$Nb$_2$O$_8$, Pb$_5$—Ge$_3$O$_{11}$, Tb$_2$(MoO$_4$)$_3$, Li$_2$B$_4$O$_7$, CdS, ZnO, Bi1$_2$SiO$_{20}$, or Bi$_{12}$GeO$_{20}$.

The polycrystalline material may be at least one of PZT ceramics, PT ceramics, PZT-complex perovskite-based structure, or BaTiO$_3$.

The polymeric material may be at least one of PVDF, P(VDF-TrFe), P(VDFTeFE), or TGS.

The composite material may be at least one of PZT-PVDF, PZT-silicone rubber, PZT-epoxy, PZT-polymer foam, or PZT-urethane foam.

The thin film-type material may be at least one of ZnO, CdS, or AlN.

The pressure calculating unit 500 may be electrically connected to the piezoelectric element 400.

The pressure calculating unit 500 calculates a magnitude of a pressure based on an electrical change generated by the piezoelectric element 400. According to an embodiment, the electrical change generated by a touch in the piezoelectric element 400 includes a voltage change at both ends of the piezoelectric element 400.

Although not illustrated, the display apparatus 1000 may further include a printed circuit board connected to the display panel 100 and/or the touch panel 200. The pressure calculating unit 500 may be realized as a circuit disposed on the printed circuit board or in a chip mounted on the printed circuit board.

Figure 2:
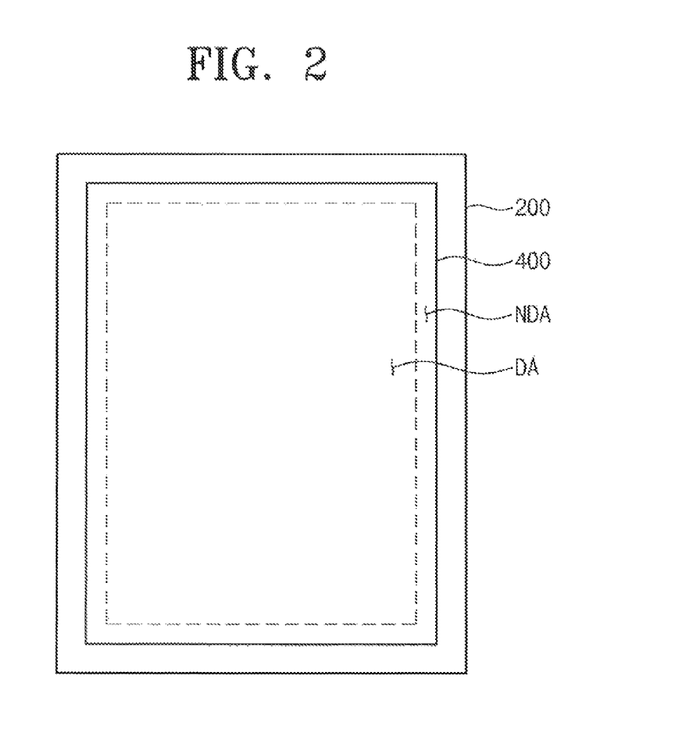
FIG. 2 is a plan view illustrating a touch panel and a piezoelectric element.

FIG. 2 is a plan view illustrating the touch panel 200 and the piezoelectric element 400 of FIG. 1.

The touch panel 200 is divided into a touch region DA extracting a touch coordinate when a touch is generated thereon and a non-touch region NDA adjacent to the touch region DA. In FIG. 2, a boundary between the touch region DA and the non-touch region NDA is illustrated as a dashed line.

The piezoelectric element 400 covers the touch region DA of the touch panel 200. The touch coordinate is calculated by using the touch panel 200 and the touch force is calculated by using the piezoelectric element 400. Therefore, in an embodiment, a plurality of piezoelectric elements 400 may not be disposed thereon.

Figure 3:
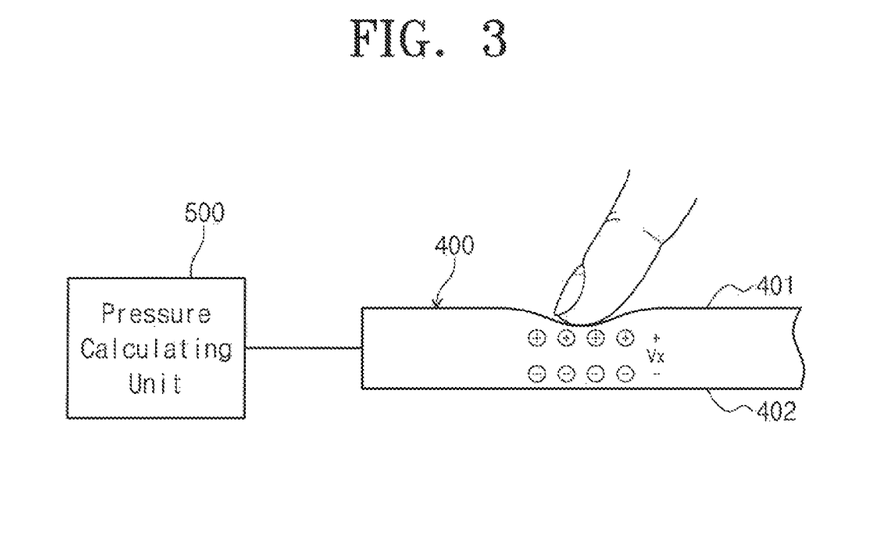
FIG. 3 is a schematic diagram illustrating a piezoelectric element and a pressure calculating unit.

FIG. 3 is a schematic diagram illustrating the piezoelectric element 400 and the pressure calculating unit 500 of FIG. 1.

According to an embodiment, before a mechanical external force is applied to the piezoelectric element 400, crystals inside the piezoelectric element 400 exhibit electrical neutrality due to a regular arrangement of positive charges and negative charges. When a mechanical external force is applied to the piezoelectric element 400, the arrangement of positive charges and negative charges is shifted in the crystals. As a result, an upper surface 401 of the piezoelectric element 400 is positively charged and a lower surface 402 of the piezoelectric element 400 is negatively charged. Due to a potential difference Vx between the upper surface 401 of the piezoelectric element 400 and the lower surface 402 of the piezoelectric element 400, the piezoelectric element 400 generates a voltage.

The pressure calculating unit 500 measures an electrical change by the piezoelectric element 400 to calculate a magnitude of a pressure.

Figure 4:
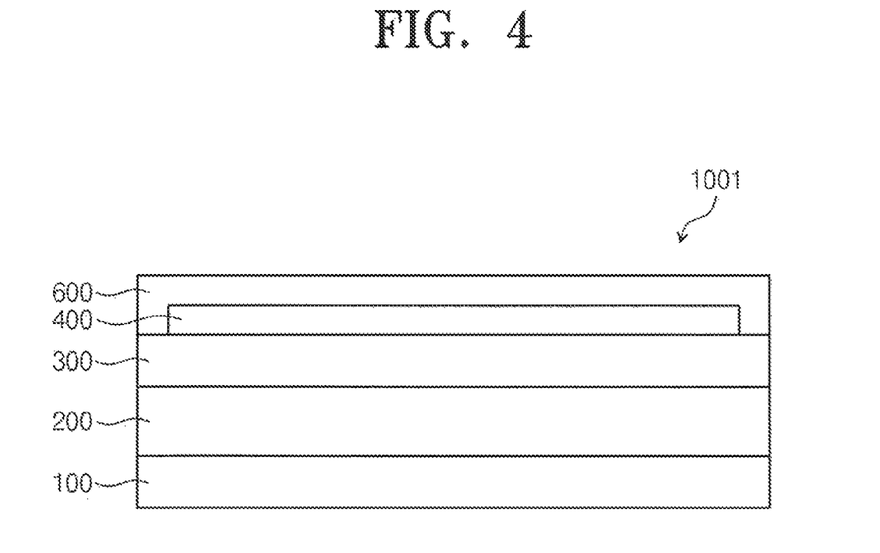
FIG. 4 is a cross-sectional view of a display apparatus according to another embodiment of the present inventive concept.

FIG. 4 is a cross-sectional view illustrating a display apparatus 1001 according to another embodiment of the present inventive concept.

The display apparatus 1001 illustrated in FIG. 4 further includes a transparent film 600 in addition to the elements of the display apparatus 1000 illustrated in FIG. 1.

The transparent film 600 is disposed on the piezoelectric element 400 and the cover glass 300. The transparent film 600 may cover the cover glass 300 and the piezoelectric element 400. The transparent film 600 may cover an upper surface and side surfaces of the piezoelectric element 400.

The piezoelectric element 400 may be damaged by a fingerprint and/or a scratch due to a touch, or by external factors such as moisture or dust. The transparent film 600 protects the piezoelectric element 400.

The transparent film 600 may be substantially transparent and most of light incident on the transparent film 600 may pass through the transparent film 600.

According to an embodiment, the transparent film 600 may be formed of a polymer resin.

Figure 5:
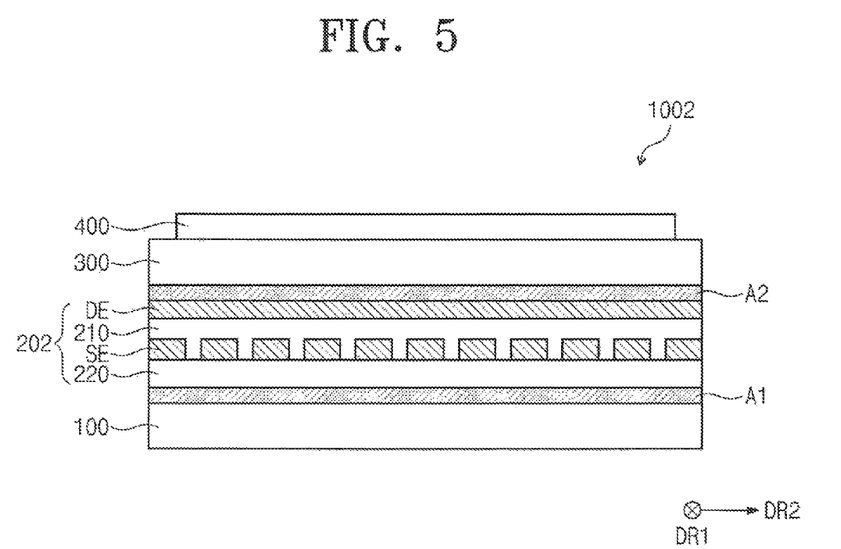
FIG. 5 illustrates a cross-sectional view of a display apparatus according to another embodiment of the present inventive concept.
Figure 6:
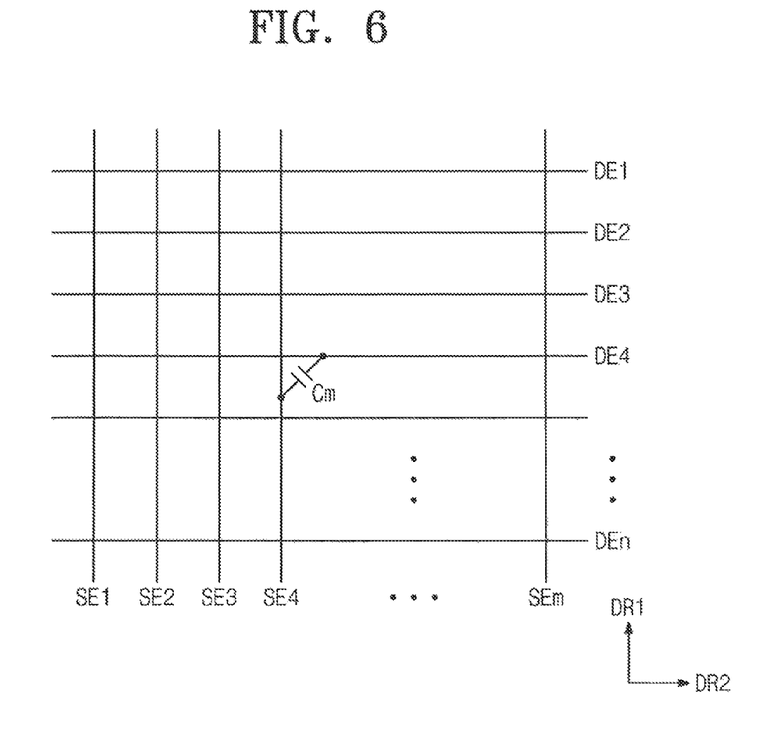
FIG. 6 is a schematic plan view illustrating an arrangement of sensing electrodes and driving electrodes which are inside a touch panel.

FIG. 5 is a cross-sectional view illustrating a display apparatus 1002 according to another embodiment of the present inventive concept; and FIG. 6 is a schematic plan view illustrating an arrangement of sensing electrodes SE and driving electrodes DE inside the touch panel 200.

Referring to FIG. 5, an arrangement order of the display panel 100, a touch panel 202, the cover glass 300, and the piezoelectric element 400 in the display apparatus 1002 is the same or substantially the same as that in the display apparatus 1000 illustrated in FIG. 1.

According to an embodiment, the display apparatus 1002 further includes a first adhesive A1 and a second adhesive A2.

Inside the display apparatus 1002, the display panel 100 and the touch panel 202 are bonded to each other by the first adhesive A1, and the touch panel 202 and the cover glass 300 are bonded to each other by the second adhesive A2.

According to an embodiment, the first and second adhesives A1 and A2 may include an optical clear adhesive (OCA) or an optical clear resin (OCR).

The touch panel 202 includes a glass substrate 220, sensing electrodes SE, an insulating layer 210, and driving electrodes DE.

The glass substrate 220 is arranged or disposed on the display panel 100. The sensing electrodes SE are arranged or disposed on the glass substrate 220. The insulating layer 210 is arranged or disposed on the sensing electrodes SE. The driving electrodes DE are arranged or disposed on the insulating layer 210.

The sensing electrodes SE and the driving electrodes DE are deposited on the glass substrate 220. The insulating layer 210 insulates the sensing electrodes SE from the driving electrodes DE.

Referring to FIGS. 5 and 6, the touch panel 202 includes m number of sensing electrodes SE1-SEm and n number of driving electrodes DE1-DEn. The m number of sensing electrodes SE1-SEm extend in a first direction DR1 and the n number of driving electrodes DE1-DEn extend in a second direction DR2 crossing the first direction DR1.

FIG. 5 illustrates the sensing electrodes SE extending in the first direction DR1 and the driving electrodes DE extending in the second direction DR2.

A capacitor Cm is disposed between each of the m number of sensing electrodes SE1-SEm and each of the n number of driving electrodes DE1-DEn. When a touch is generated by a user, capacitance of the capacitor Cm formed by the driving electrodes DE and the sensing electrodes SE which are corresponding to the touch coordinate is changed. Although not illustrated, the display apparatus 1002 may further include a touch processor. The touch processor may extract the amount of change in the capacitance of the capacitor Cm to calculate a touch coordinate. The touch processor may be realized as a circuit disposed on a printed circuit board or may be realized in a chip mounted on a printed circuit board.

Figure 7:
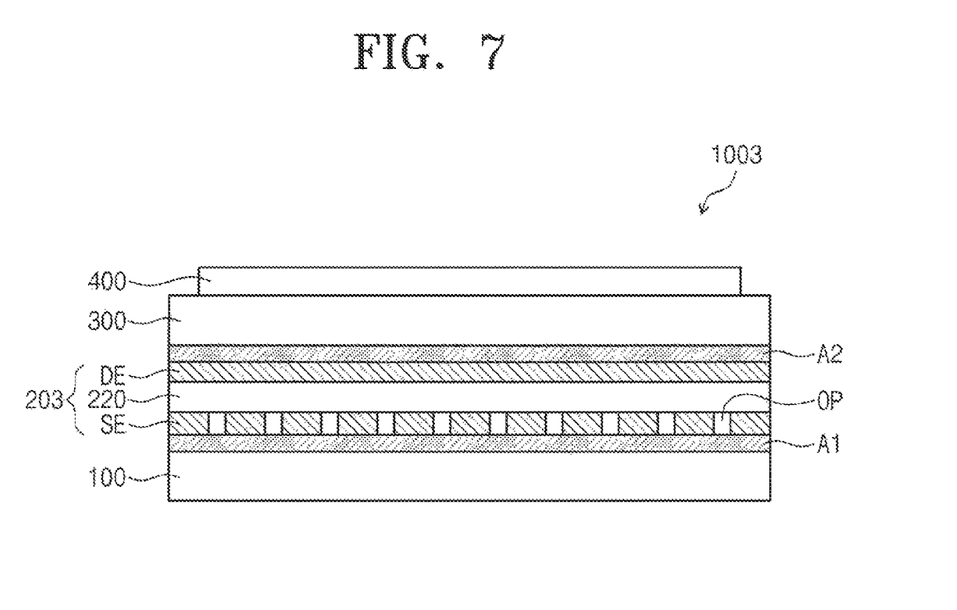
FIG. 7 is a cross-sectional view of a display apparatus according to another embodiment of the present inventive concept.

FIG. 7 is a cross-sectional view illustrating a display apparatus 1003 according to another embodiment of the present inventive concept.

Referring to FIG. 7, an arrangement order of the display panel 100, a touch panel 203, the cover glass 300, and the piezoelectric element 400 in the display apparatus 1003 is the same or substantially the same as that in the display apparatus 1000 illustrated in FIG. 1.

The display apparatus 1003 illustrated in FIG. 7 further includes the first adhesive A1 and the second adhesive A2.

Inside the display apparatus 1003, the display panel 100 and the touch panel 203 are bonded to each other by the first adhesive A1, and the touch panel 203 and the cover glass 300 are bonded to each other by the second adhesive A2.

According to an embodiment, the first and second adhesives A1 and A2 may include an optical clear adhesive (OCA) or an optical clear resin (OCR).

The touch panel 203 includes the glass substrate 220, sensing electrodes SE, and driving electrodes DE.

The sensing electrodes SE are arranged or disposed on the display panel 100. The glass substrate 220 is arranged or disposed on the sensing electrodes SE. The driving electrodes DE are arranged or disposed on the glass substrate 220.

Openings OP may be provided between the sensing electrodes SE. Openings may be provided between the driving electrodes DE.

The sensing electrodes SE are deposited under the glass substrate 220, and the driving electrodes DE are deposited on the glass substrate 220. The glass substrate 220 insulates the sensing electrodes SE from the driving electrodes DE.

Figure 8:
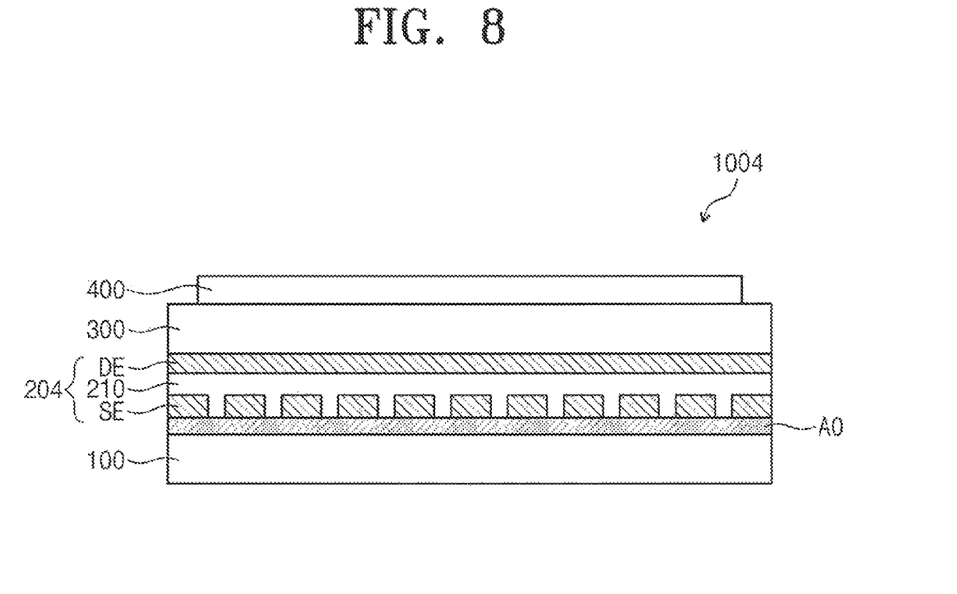
FIG. 8 is a cross-sectional view of a display apparatus according to another embodiment of the present inventive concept.

FIG. 8 is a cross-sectional view illustrating a display apparatus 1004 according to another embodiment of the present inventive concept.

Referring to FIG. 8, an arrangement order of the display panel 100, a touch panel 204, the cover glass 300, and the piezoelectric element 400 in the display apparatus 1004 is the same or substantially the same as that in the display apparatus 1000 illustrated in FIG. 1.

The display apparatus 1004 illustrated in FIG. 8 further includes an adhesive A0.

Inside the display apparatus 1004, the display panel 100 and the touch panel 204 are bonded to each other by the adhesive A0.

According to an embodiment, the adhesive A0 may include an optical clear adhesive (OCA) or an optical clear resin (OCR).

The touch panel 204 includes the insulating layer 210, sensing electrodes SE, and driving electrodes DE.

The sensing electrodes SE are arranged or disposed on the display panel 100. The insulating layer 210 is arranged or disposed on the sensing electrodes SE. The driving electrodes DE are arranged or disposed on the insulating layer 210.

The driving electrodes DE and the sensing electrodes SE are deposited under the cover glass 300. The insulating layer 210 insulates the sensing electrodes SE from the driving electrodes DE.

Figure 9:
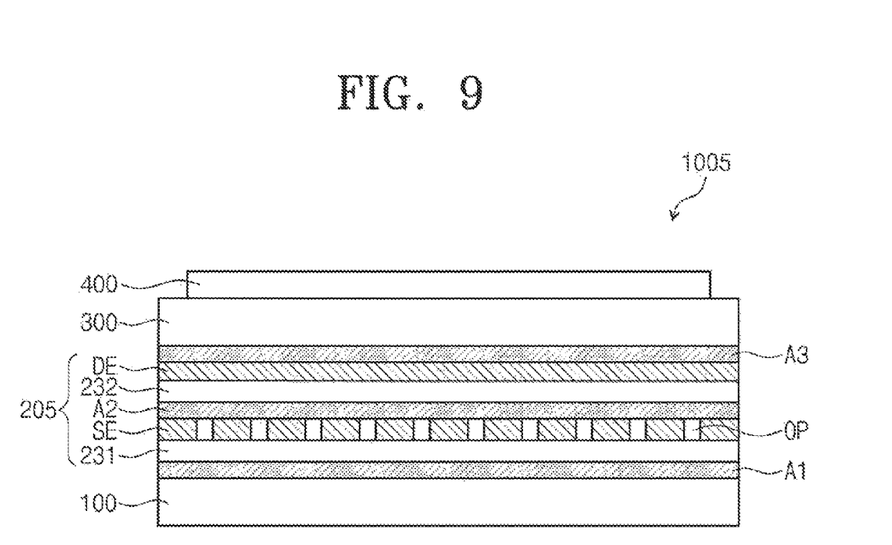
FIG. 9 is a cross-sectional view of a display apparatus according to another embodiment of the present inventive concept.

FIG. 9 is a cross-sectional view illustrating a display apparatus 1005 according to another embodiment of the present inventive concept.

Referring to FIG. 9, an arrangement order of the display panel 100, a touch panel 205, the cover glass 300, and the piezoelectric element 400 in the display apparatus 1005 is the same or substantially the same as that in the display apparatus 1000 illustrated in FIG. 1.

The display apparatus 1005 illustrated in FIG. 9 further includes the first adhesive A1 and a third adhesive A3.

Inside the display apparatus 1005, the display panel 100 and the touch panel 205 are bonded to each other by the first adhesive A1, and the touch panel 205 and the cover glass 300 are bonded to each other by the third adhesive A3.

According to an embodiment, the first and third adhesives A1 and A3 may include an optical clear adhesive (OCA) or an optical clear resin (OCR).

The touch panel 205 includes sensing electrodes SE, driving electrodes DE, a first polyethylene terephthalate (PET) film 231, a second PET film 232, and the second adhesive A2.

The first PET film 231 is arranged or disposed on the display panel 100. The sensing electrodes SE are arranged or disposed on the first PET film 231. The second adhesive A2 is disposed on the sensing electrodes SE. The second PET film 232 is arranged or disposed on the second adhesive A2. The driving electrodes DE are arranged or disposed on the second PET film 232.

Openings OP may be provided between the sensing electrodes SE. Openings may be provided between the driving electrodes DE.

The sensing electrodes SE are deposited on the first PET film 231, and the driving electrodes DE are deposited on the second PET film 232.

The sensing electrodes SE and the second PET film 232 are bonded to each other by the second adhesive A2. The second PET film 232 insulates the sensing electrodes SE from the driving electrodes DE.

According to an embodiment, the second adhesive A2 may include an optical clear adhesive (OCA) or an optical clear resin (OCR).

Figure 10:
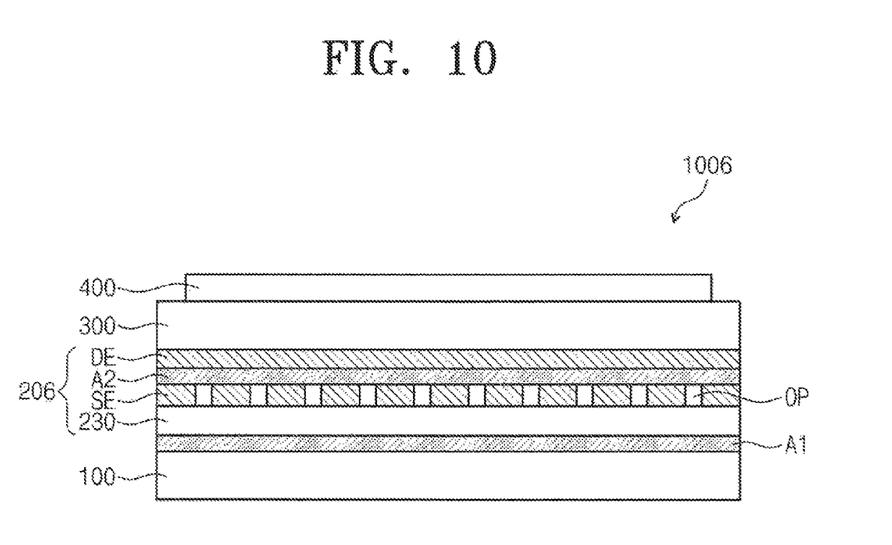
FIG. 10 is a cross-sectional view of a display apparatus according to another embodiment of the present inventive concept.

FIG. 10 is a cross-sectional view illustrating a display apparatus 1006 according to another embodiment of the present inventive concept.

Referring to FIG. 10, an arrangement order of the display panel 100, a touch panel 206, the cover glass 300, and the piezoelectric element 400 in the display apparatus 1006 is the same or substantially the same as that in the display apparatus 1000 illustrated in FIG. 1.

The display apparatus 1006 illustrated in FIG. 10 further includes the first adhesive A1.

Inside the display apparatus 1006, the display panel 100 and the touch panel 206 are bonded to each other by the first adhesive A1.

According to an embodiment, the first adhesives A1 may include an optical clear adhesive (OCA) or an optical clear resin (OCR).

The touch panel 206 includes a PET film 230, sensing electrodes SE, driving electrodes DE, and the second adhesive A2.

The PET film 230 is arranged or disposed on the display panel 100. The sensing electrodes SE are arranged or disposed on the PET film 230. The second adhesive A2 is disposed on the sensing electrodes SE. The driving electrodes DE are arranged or disposed on the second adhesive A2.

Openings OP may be provided between the sensing electrodes SE. Openings may be provided between the driving electrodes DE.

The sensing electrodes SE are deposited on the PET film 230, and the driving electrodes DE are deposited under the cover glass 300. The second adhesive A2 insulates the sensing electrodes SE from the driving electrodes DE. The second adhesive A2 bonds the sensing electrodes SE and the driving electrodes DE to each other.

According to an embodiment, the second adhesives A2 may include optical clear adhesive (OCA) or optical clear resin (OCR).

Figure 11:
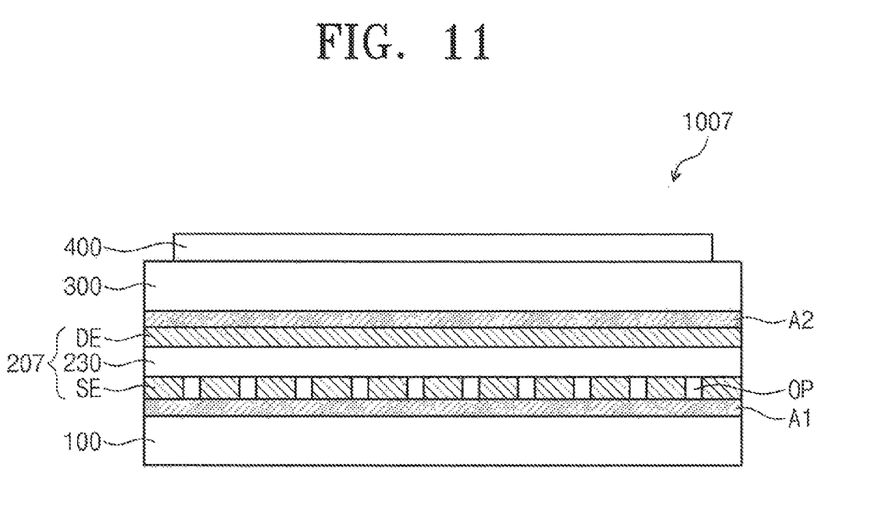
FIG. 11 is a cross-sectional view of a display apparatus according to another embodiment of the present inventive concept.

FIG. 11 is a cross-sectional view illustrating a display apparatus 1007 according to another embodiment of the present inventive concept.

Referring to FIG. 11, an arrangement order of the display panel 100, a touch panel 207, the cover glass 300, and the piezoelectric element 400 in the display apparatus 1007 is the same or substantially the same as that in the display apparatus 1000 illustrated in FIG. 1.

The display apparatus 1007 illustrated in FIG. 11 further includes the first adhesive A1 and the second adhesive A2.

Inside the display apparatus 1007, the display panel 100 and the touch panel 207 are bonded to each other by the first adhesive A1, and the touch panel 207 and the cover glass 300 are bonded to each other by the second adhesive A2.

According to an embodiment, the first and second adhesives A1 and A2 may include an optical clear adhesive (OCA) or an optical clear resin (OCR).

The touch panel 207 includes the PET film 230, sensing electrodes SE, and driving electrodes DE.

The sensing electrodes SE are arranged or disposed on the display panel 100. The PET film 230 is arranged or disposed on the sensing electrodes SE. The driving electrodes DE are arranged or disposed on the PET film 230.

Openings OP may be provided between the sensing electrodes SE. Openings may be provided between the driving electrodes DE.

The sensing electrodes SE are deposited under the PET film 230, and the driving electrodes DE are deposited on the PET film 230. The PET film 230 insulates the sensing electrodes SE from the driving electrodes DE.

Figure 12:
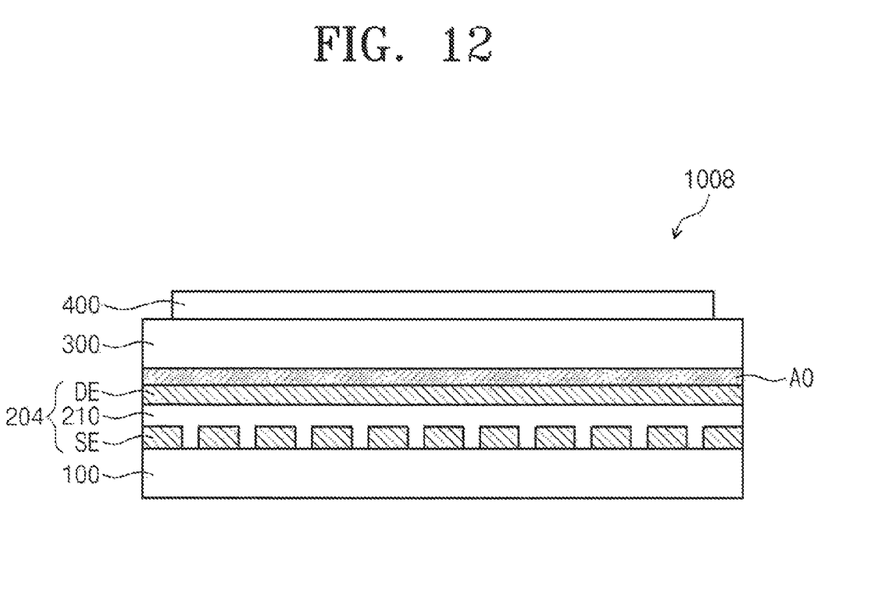
FIG. 12 is a cross-sectional view of a display apparatus according to another embodiment of the present inventive concept.

FIG. 12 is a cross-sectional view illustrating a display apparatus 1008 according to another embodiment of the present inventive concept.

Referring to FIG. 12, an arrangement order of the display panel 100, the touch panel 204, the cover glass 300, and the piezoelectric element 400 in the display apparatus 1008 is the same or substantially the same as that in the display apparatus 1000 illustrated in FIG. 1.

The display apparatus 1008 illustrated in FIG. 12 further includes the adhesive A0.

Inside the display apparatus 1008, the touch panel 204 and the cover glass 300 are bonded to each other by the adhesive A0.

According to an embodiment, the adhesives A0 may include an optical clear adhesive (OCA) or an optical clear resin (OCR).

The touch panel 204 includes the insulating layer 210, sensing electrodes SE, and driving electrodes DE.

The sensing electrodes SE are arranged or disposed on the display panel 100. The insulating layer 210 is arranged or disposed on the sensing electrodes SE. The driving electrodes DE are arranged or disposed on the insulating layer 210.

The sensing electrodes SE and the driving electrodes DE are deposited on the display panel 100. The insulating layer 210 insulates the sensing electrodes SE from the driving electrodes DE.

Figure 13:
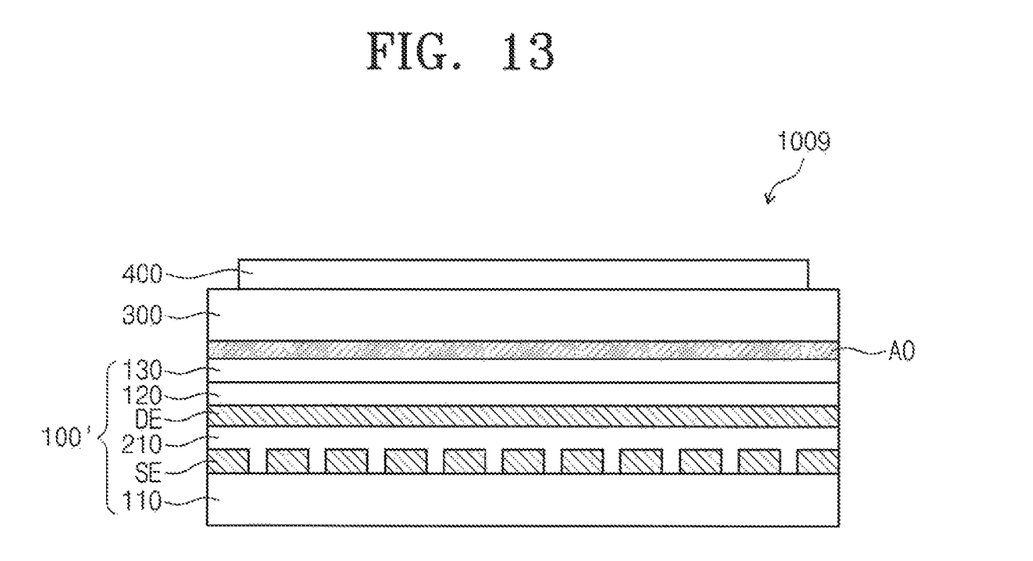
FIG. 13 is a cross-sectional view of a display apparatus according to another embodiment of the present inventive concept.

FIG. 13 is a cross-sectional view illustrating a display apparatus 1009 according to another embodiment of the present inventive concept.

Referring to FIG. 13, the display apparatus 1009 includes a display panel 100', the cover glass 300, and the piezoelectric element 400. The cover glass 300 is arranged or disposed on the display panel 100'. The piezoelectric element 400 is arranged or disposed on the cover glass 300.

The display apparatus 1009 illustrated in FIG. 13 further includes the adhesive A0.

Inside the display apparatus 1009, the display panel 100' and the cover glass 300 are bonded to each other by the adhesive A0.

According to an embodiment, the adhesives A0 may include an optical clear adhesive (OCA) or an optical clear resin (OCR).

The display panel 100' includes a thin film transistor substrate 110, a liquid crystal layer 120, a color filter substrate 130, sensing electrodes SE, driving electrodes DE, and the insulating layer 210.

The sensing electrodes SE are arranged or disposed on the thin film transistor substrate 110. The insulating layer 210 is arranged or disposed on the sensing electrodes SE. The driving electrodes DE are arranged or disposed on the insulating layer 210. The liquid crystal layer 120 is arranged or disposed on the driving electrodes DE. The color filter substrate 130 is arranged or disposed on the liquid crystal layer 120.

The sensing electrodes SE and the driving electrodes DE are deposited on the thin film transistor substrate 110. The insulating layer 210 insulates the sensing electrodes SE from the driving electrodes DE.

According to embodiments of the present inventive concept, a piezoelectric element is disposed on a cover glass, and display apparatuses may recognize a touch force.

Although some exemplary embodiments of the present inventive concept are described with reference to the accompanying drawings, it will be understood to those of ordinary skill in the art to which the present inventive concept pertains that the present inventive concept may be carried out in other forms. Therefore, the embodiments described above are exemplary and not restrictive.

What is claimed is:

1. A display apparatus comprising:
a display panel configured to display an image;
a touch panel on the display panel and including a touch region configured to extract a touch coordinate when a touch is generated thereon, and a non-touch region adjacent to the touch region;
a cover glass on the touch panel;
a piezoelectric element on the cover glass and covering the touch region, the piezoelectric element being configured to generate an electrical change by a pressure of the touch; and
a pressure calculating unit configured to calculate a magnitude of the pressure based on the generated electrical change.

2. The display apparatus of claim 1, wherein the piezoelectric element has a larger area than the touch region of the touch panel.

3. The display apparatus of claim 1, further comprising a transparent film on the piezoelectric element and the cover glass and covering the piezoelectric element.

4. The display apparatus of claim 1, wherein the electrical change is a change in a voltage.

5. The display apparatus of claim 1, wherein the piezoelectric element comprises at least one of $\alpha$-$AlPO_4$ (berlinite), $\alpha$-$SiO_2$ (quartz), $LiTaO_3$, $LiNbO_3$, $Sr_xBa_yNb_2O_8$, $Pb_5$—$Ge_3O_{11}$, $Tb_2(MoO_4)_3$, $Li_2B_4O_7$, CdS, ZnO, $Bi_{12}SiO_{20}$, or $Bi_{12}GeO_{20}$.

6. The display apparatus of claim 1, wherein the piezoelectric element comprises at least one of a PZT ceramic, a PT ceramic, a PZT-complex perovskite-based structure, or $BaTiO_3$.

7. The display apparatus of claim 1, wherein the piezoelectric element comprises at least one of ZnO, CdS, or AlN.

8. The display apparatus of claim 1, wherein the piezoelectric element comprises at least one of PVDF, P(VDF-TrFe), P(VDFTeFE), or TGS.

9. The display apparatus of claim 1, wherein the piezoelectric element comprises at least one of PZT-PVDF, PZT-silicone rubber, PZT-epoxy, PZT-polymer foam, or PZT-urethane foam.

10. The display apparatus of claim 1, wherein the touch panel comprises:
sensing electrodes; and
driving electrodes electrically insulated from the sensing electrodes.

11. The display apparatus of claim 10,
wherein the touch panel further comprises:
a glass substrate on the display panel; and
an insulating layer between the glass substrate and the cover glass,
wherein the sensing electrodes are between the glass substrate and the insulating layer, and the driving electrodes are between the insulating layer and the cover glass, and
wherein the display apparatus further comprises:
a first adhesive bonding the touch panel and the display panel to each other; and
a second adhesive bonding the touch panel and the cover glass to each other.

12. The display apparatus of claim 10,
wherein the touch panel further comprises a glass substrate on the display panel, wherein the sensing electrodes are between the glass substrate and the display panel, and the driving electrodes are between the glass substrate and the cover glass, and
wherein the display apparatus further comprises:
a first adhesive bonding the touch panel and the display panel to each other; and
a second adhesive bonding the touch panel and the cover glass to each other.

13. The display apparatus of claim 10,
wherein the touch panel further comprises an insulating layer on the display panel, wherein the sensing electrodes are between the display panel and the insulating layer, and the driving electrodes are between the insulating layer and the cover glass, and
wherein the display apparatus further comprises an adhesive bonding the display panel and the touch panel to each other.

14. The display apparatus of claim 10, wherein the touch panel further comprises:
a first PET film on the display panel;
a second PET film on the first PET film; and
a second adhesive on the sensing electrodes,
wherein the sensing electrodes are between the first and second PET films, the driving electrodes are between the second PET film and the cover glass, and the second adhesive is between the sensing electrodes and the second PET film and bonding the sensing electrodes and the second PET film to each other, and
wherein the display apparatus further comprises:
a first adhesive bonding the display panel and the touch panel to each other; and
a third adhesive bonding the touch panel and the cover glass to each other.

15. The display apparatus of claim 10, wherein the touch panel further comprises:
a PET film on the display panel; and
a second adhesive on the PET film,
wherein the sensing electrodes are between the PET film and the cover glass, the driving electrodes are between the sensing electrodes and the cover glass, and the second adhesive is between the sensing electrodes and the driving electrodes, insulates the sensing electrodes from the driving electrodes and bonding the sensing electrodes and the driving electrodes to each other, and wherein the display apparatus further comprises a first adhesive bonding the display panel and the touch panel to each other.

16. The display apparatus of claim 10, wherein the touch panel further comprises a PET film on the display panel, wherein the sensing electrodes are between the display panel and the PET film, and the driving electrodes are between the PET film and the cover glass, and wherein the display apparatus further comprises:
- a first adhesive bonding the display panel and the touch panel to each other; and
- a second adhesive bonding the touch panel and the cover glass to each other.

17. The display apparatus of claim 10, wherein the touch panel further comprises an insulating layer on the display panel, wherein the sensing electrodes are between the display panel and the insulating layer, and the driving electrodes are between the insulating layer and the cover glass, and wherein the display apparatus further comprises an adhesive bonding the touch panel and the cover glass to each other.

18. A display apparatus comprising:
- a display panel configured to display an image and including a touch region configured to extract a touch coordinate when a touch is generated thereon, and a non-touch region adjacent to the touch region;
- a cover glass on the display panel;
- a piezoelectric element on the cover glass and covering the touch region, the piezoelectric element being configured to generate an electrical change by a pressure of the touch; and
- a pressure calculating unit configured to calculate a magnitude of the pressure based on the generated electrical change.

19. The display apparatus of claim 18, wherein the display panel comprises:
- a thin film transistor (TFT) substrate;
- a color filter substrate on the thin film transistor (TFT) substrate;
- a liquid crystal layer between the thin film transistor (TFT) substrate and the color filter substrate;
- sensing electrodes between the thin film transistor (TFT) substrate and the liquid crystal layer;
- driving electrodes between the sensing electrodes and the liquid crystal layer; and
- an insulating layer between the sensing electrodes and the driving electrodes.

20. The display apparatus of claim 19, further comprising an adhesive bonding the display panel and the cover glass to each other.

* * * * *